(12) United States Patent
Smith

(10) Patent No.: US 6,389,208 B1
(45) Date of Patent: *May 14, 2002

(54) HIGH DISPERSION ZERO WAVEGUIDE FIBER

(75) Inventor: David K. Smith, Wilmington, NC (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,750

(22) Filed: Jun. 4, 1998

Related U.S. Application Data

(60) Provisional application No. 60/050,550, filed on Jun. 23, 1997.

(51) Int. Cl.[7] .................................................. G02B 6/22
(52) U.S. Cl. ........................ 385/127; 385/123; 385/124; 385/126
(58) Field of Search ................................ 385/124–128, 385/123

(56) References Cited

U.S. PATENT DOCUMENTS

| | | | |
|---|---|---|---|
| 5,483,612 A | 1/1996 | Gallagher et al. | ........... 385/127 |
| 5,822,488 A | 10/1998 | Terasawa et al. | ........... 385/127 |

FOREIGN PATENT DOCUMENTS

| | | | |
|---|---|---|---|
| EP | 0 689 068 A | 12/1995 | |
| EP | 0 724 171 A | 7/1996 | |
| EP | 0 775 924 A | 5/1997 | |

*Primary Examiner*—Hemang Sanghavi
(74) *Attorney, Agent, or Firm*—William J. Chervenak

(57) ABSTRACT

Disclosed is a single mode optical waveguide fiber designed for use in high performance telecommunication systems. The novel core profile design improves bending performance to provide enhanced resistance to adverse environments. Total dispersion over an extended wavelength window is maintained low by placing the zero dispersion wavelength above the upper limit of the operating window. In addition, cut off wavelength is increased to just below the operating window. Ease of manufacture is retained as is very low waveguide attenuation.

5 Claims, 1 Drawing Sheet

HIGH DISPERSION ZERO WAVEGUIDE FIBER

This application is based upon the provisional application Ser. No. 60/050,550, filed Jun. 23, 1997, which we claim as the priority date of this application.

BACKGROUND OF THE INVENTION

The invention relates to a single mode optical waveguide fiber having a zero dispersion wavelength greater than the upper limit of the operating wavelength window. This property is achieved together with resistance to bend induced attenuation.

Telecommunication systems using high powered lasers, high data rate transmitters and receivers, and wavelength division multiplexing (WDM) technology require optical waveguide fiber having exceptionally low, but non-zero, total dispersion, and exceptionally low polarization mode dispersion (PMD). In addition, the waveguide fiber must have characteristics which essentially eliminate non-linear phenomena such as self phase modulation (SPM) and four wave mixing (FWM). The SPM can be limited by lowering power density, for example by increasing the mode field diameter of the waveguide fiber. The FWM is controlled by operating in a wavelength range over which dispersion is non-zero.

A further requirement is that the optical waveguide be compatible with long length systems incorporating optical amplifiers.

The compound core design, disclosed in U.S. Pat. No. 5,483,612, provides a waveguide fiber which meets these requirements. More recently, additional waveguide fiber requirements were identified for systems in which cable installation is difficult or cable accessibility after installation is limited. In particular, such installations require an expanded wavelength operating window to provide for an increase in the number of WDM channels. The wider operating window allows for greater information transmission over each waveguide fiber which in turn reduces cable and installation costs. Due the limited accessibility after installation, the cable must be exceptional in terms of maintaining its properties over time. For example, waveguide fiber exhibiting improved bend performance in use is needed. Furthermore, this high performance system will most likely include large repeater spacing which emphasizes the need for low total dispersion and low polarization mode dispersion (PMD).

Definitions

The following definitions are in accord with common usage in the art.

The radii of the regions of the core are defined in terms of the index of refraction. A particular region has a first and a last refractive index point. The radius from the waveguide centerline to the location of this first refractive index point is the inner radius of the core region or segment. Likewise, the radius from the waveguide centerline to the location of the last refractive index point is the outer radius of the core segment. Other useful definitions of core geometry may be conveniently used.

Unless specifically noted otherwise in the text, the parameters of the index profiles discussed here are conveniently defined as follows:

radius of the central core region is measured from the axial centerline of the waveguide to the intersection of the extrapolated central index profile with the x axis;

radius of the second annular region is measured from the axial centerline of the waveguide to the center of the baseline of the second annulus; and, the width of the second annular region is the distance between parallel lines drawn from the half refractive index points of the index profile to the waveguide radius.

The dimensions of the first annular region are determined by difference between the central region and second annular region dimensions.

The effective area is $$A_{eff} = 2\pi (\int E^2 r dr)^2 / (\int E^4 r dr),$$

where the integration limits are 0 to $\infty$, and E is the electric field associated with the propagated light. An effective diameter, $D_{eff}$, may be defined as, $$A_{eff} = \pi (D_{eff}/2)^2.$$

The initials PMD represent polarization mode dispersion.

The initials WDM represent wavelength division multiplexing.

The initials SPM represent self phase modulation, the phenomenon wherein portions of a signal above a specific power level travel at a different speed in the waveguide relative to portions of the signal below that power level.

The initials FWM represent four wave mixing, the phenomenon wherein two or more signals in a waveguide interfere to produce signals of different frequencies.

The term $\Delta\%$, represents a relative measure of refractive index defined by the equation, $$\Delta\% = 100 \times (n_1^2 - n_2^2)/2n_1^2,$$

where $n_1$ is the maximum refractive index in region 1 and $n_{2c}$ is the refractive index in the reference region which is usually taken to be the cladding region.

The term refractive index profile or simply index profile is the relation between $\Delta\%$ or refractive index and radius over a selected portion of the core. The term alpha profile refers to a refractive index profile which follows the equation, $$n(r) = n_0(1 - \Delta[r/a]_\alpha)$$

where r is radius, $\Delta$ is defined above, a is the last point in the profile, r is chosen to be zero at the first point of the profile, and $\alpha$ is an exponent which defines the profile shape. Other index profiles include a step index, a trapezoidal index and a rounded step index, in which the rounding is due to dopant diffusion in regions of rapid refractive index change.

The profile volume is defined as $2\int_{r1}^{r2} (\Delta\% \, r dr)$. The inner profile volume extends from the waveguide centerline, r=0, to the crossover radius. The outer profile volume extends from the cross over radius to the last point of the core. The units of the profile volume are $\% \, \mu m^2$ because index has no units. To avoid confusion, the profile volumes will be connoted a number followed by the word units.

The crossover radius is found from the dependence of power distribution in the signal as signal wavelength changes. Over the inner volume, signal power decreases as wavelength increases. Over the outer volume, signal power increases as wavelength increases.

The bend resistance of a waveguide fiber is expressed as induced attenuation under prescribed test conditions. In this document 75 mm bend refers to the attenuation induced in the waveguide by 100 turns about a 75 mm mandrel. A 32 mm bend refers to the attenuation induced in a waveguide by 1 turn about a 32 mm mandrel.

SUMMARY OF THE INVENTION

There is a need then for an optical waveguide fiber, superior to that disclosed in U.S. Pat. No. 5,483,612 ('612 patent) which can meet the requirements of such very high performance systems by providing:

low attenuation over an expanded wavelength window;
low total and PMD dispersion over the expanded window; and,
exceptional resistance to bend induced attenuation over time in harsh environments.

The novel waveguide meets this need by modifying the core index profile design. Through a process of computer modeling and manufacturing trials, a family of index core profiles has been found which exhibit a higher cut off wavelength for improved bend resistance and which also has a higher zero dispersion wavelength to provide low total dispersion over an extended wavelength window.

It should be emphasized that waveguide fiber properties are very sensitive to changes in core refractive index profile. Thus, it is not possible to predict the effect of profile changes on waveguide properties and performance. This is true even in those cases in which the profile changes appear to be small or two profile families appear to be closely related.

An aspect of the invention is a single mode optical waveguide fiber having a core which includes three segments, a central core region arranged about the symmetry axis of the waveguide, and a first annular region abutting the central region, and a second annular region abutting the first annular region.

The central region may have a sharp decrease in refractive index very near the waveguide centerline. This sharp decrease may occur due to diffusion of dopant from the centerline region during particular process steps. One may compensate for this diffusion in the deposition step, thereby effectively eliminating the centerline volume having the decreased index. As an alternative the model may be adjusted to account for the dopant diffusion. If this latter alternative is chosen, the centerline index decrease is considered to be part of the central region. Thus, the claims and the description are not effected by whether one chooses to eliminate the centerline refractive index decrease or to compensate for the diffusion of centerline dopant by adjusting other portions of the core refractive index profile.

The central region and the second annular region have a relatively high refractive index as compared to that of first annular region and the clad layer which surrounds and abuts the second annular region. The novel waveguide has an inner profile volume in the range of 2.90 to 3.90 units and an outer profile volume of 7.20 to 10.20 units. The outer to inner profile volume ratio is in the range 1.96 to 3.04. The distinctive feature of this core refractive index profile is the comparatively large outer volume relative to the nearest prior art set forth in the '612 patent.

Any of the three segments can have an index profile of $\alpha$, step, rounded step, or trapezoidal shape providing the limitations on relative refractive index and profiles inner and outer volumes are met. In general, $\alpha$ may take on any value from zero to infinity. An index profile having an $\alpha$ value of 1 is readily manufactured and provides a waveguide having the required performance. An $\alpha$ value above about 4, yields an index profile which is essentially a step index.

The unique set of properties required for systems such as that mentioned above and provided by the novel waveguide are: low total dispersion, in the range of −0.75 ps/nm-km to −5.5 ps/nm-km over a wavelength range of 1525 nm to 1565 nm; a zero dispersion wavelength in the range of about 1575 nm to 1595 nm; a dispersion slope of magnitude less than about 0.10 ps/nm-km over the wavelength range; a mode field diameter no less than about 7.90 $\mu$m; cut off wavelength, measured after the waveguide has been cabled, in the range of about 1400 nm to 1520 nm; PMD no greater than about 0.25 ps/km$^{1/2}$; 75 mm mandrel induced bend attenuation no greater than about 0.03 dB; and 32 mm mandrel induced bend attenuation no greater than about 0.30 dB.

This comprehensive and stringent set of properties are met by a waveguide having a core refractive index profile defined as follows. Using the definitions and conventions given above, the central segment of the core has $\Delta_0\%$ in the range of about 0.79% to 1.21% and a radius in the range of about 2.55 $\mu$m to 3.55 $\mu$m. A first annulus abuts the central core and has $\Delta_1\%$ no greater than about 0.20%. A second annulus abuts the first annulus and has $\Delta_2\%$ in the range of about 0.30% to 1.2%, a radius, measured to the center of the second annulus, in the range of about 5.5 $\mu$m to 8.70 $\mu$m, and a width, measured between the half $\Delta\%$ points, in the range of about 0.4 $\mu$m to 2 $\mu$m.

The inner and outer profile volumes associated with this family of refractive index profiles are in the respective ranges of about 2.9 to 3.9 units and 2.5 to 10.2 units.

The refractive index shapes of the respective segments may be chosen from among an $\alpha$ profile, a step index, a rounded step index, or a trapezoidal profile. As before, $\alpha$ can be any positive number.

DESCRIPTION OF THE PREFERRED EMBODIMENTS

Figure 1:
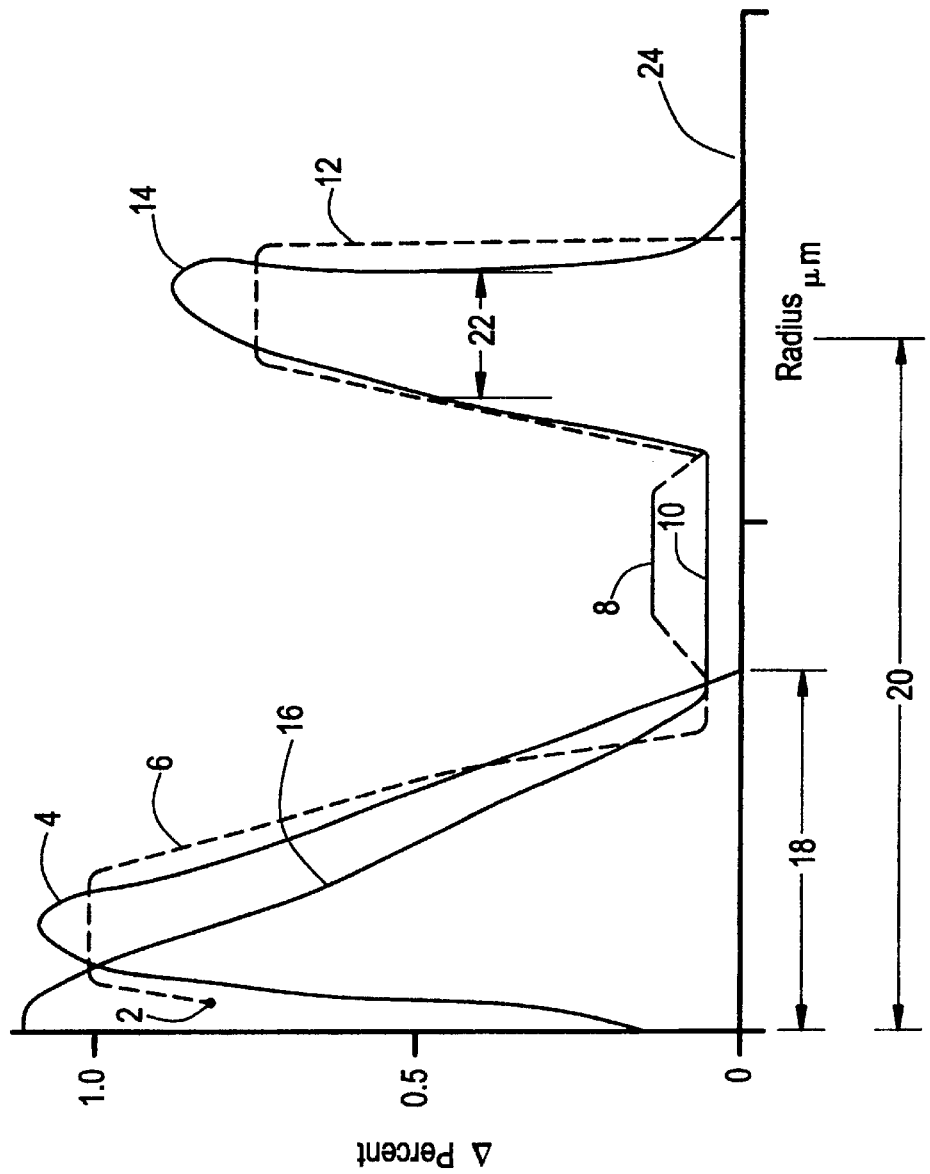
FIG. 1 is an illustration of the core refractive index profile of the novel optical waveguide fiber.

The centerline diffusion phenomenon is described in the invention summary section. The preferred embodiment of the novel core refractive index profile has the volume of decreased refractive index on the waveguide centerline, termed the centerline diffusion cone, because manufacture of the novel profile is easier when process adjustments to eliminate the centerline diffusion cone are not made. Further, the effect of the centerline diffusion cone on waveguide properties is small enough that only minor adjustments need be made in the remaining portions of the core index profile to compensate for the centerline diffusion cone.

The main features of the novel profile are shown in FIG. 1 which is a chart of $\Delta\%$ versus waveguide radius. By comparing FIG. 1 of this document with that to the '612 patent, one sees that the novel profile disclosed herein is a species of the genus of profiles disclosed and claimed in the '612 patent. The centerline diffusion cone is shown as region 2 in FIG. 1. The high refractive index central region 4 is an $\alpha$ profile, in which $\alpha$ is between 1 and 2.

Alternative central regions are shown as 6, a rounded or trapezoidal profile, and 16, an $\alpha$ profile in which a is between 1 and 2, and compensation has been provided to eliminate the centerline diffusion cone. The alternative shapes are shown to point out that profile shape, along with $\Delta\%$, radius, and width of the segments may be varied to achieve the required waveguide properties.

The first annular region, 10, abuts the central region and has a lower $\Delta\%$. An alternative profile shape, 8, is shown for this first annular region. The second annular region, which abuts the first annular region, is shown as having alternative profile shapes 12 or 14. The cladding layer which abuts the second annulus is indicated as 24.

FIG. 1 also illustrates the dimension conventions used herein. Thus central core radius is shown as 18, the distance from the waveguide centerline to the point where the extrapolated central profile crosses the x-axis. The radius defining the location of the second annular region is distance 20 from the waveguide centerline to the center of the second annulus projected to the x-axis. The width of the second annulus, measured at the one-half Δ% points is shown as length 22. Note that the inner radius of the of the first annulus is length 18. The outer radius of the first annulus is the distance found by subtracting one half of width 22 from radius 20.

A preferred embodiment, in terms of ease of manufacture and insensitivity to small profile deviations from nominal is given by the combination of profile segments 4, 10, and 14. This is a profile which allows for the centerline diffusion cone 2, has a central region of a α≈1, a step profile in the first annular region, and a rounded step index profile in the second annular region. The clad layer refractive index is constant. The central core region has $\Delta_0\%$ at 0.9% and a radius of 3.2 μm. The first annular region has $\Delta_1\%$ at 0.02%. The second annular region has $\Delta_2\%$ at 0.5%, center radius 7 μm and width at half Δ% of 0.9. The respective inner volume and outer volumes are 3.4 and 7.3 units. An alternative profile which provides the same properties as this preferred embodiment is one in which $\Delta_2\%$ is 0.25% and width is 1.8 μm.

This preferred embodiment provides dispersion in the range −6 to −0.5 ps/nm-km over the wavelength range 1525 nm to 1565 nm together with a moderate dispersion slope of about 0.075 ps/nm2-km. The sensitivity of waveguide properties to manufacturing variances is good which translates into acceptable product yield. Bend loss is less than half that of the waveguide type disclosed in the '612 patent due primarily to the cut off wavelength, measured on the cabled waveguide, is near 1500 nm. In addition, mode field is nominally at 8.4 μm, effective area is about 53 μm$^2$.

Given the specified ranges and requirements:
Zero Dispersion λ—1575 nm to 1595 nm;
Dispersion Slope <0.1 ps/nm$^2$-km;
Mode Field Diameter—7.9 μm to 9.1 μm;
Cut off λ (uncabled waveguide)—1760 nm; and
Bend resistance at least as good as the waveguide designs of the '612 patent; the model predicts the waveguide physical properties shown in Table 1.

TABLE 1

| | $\Delta_0$ % | $r_0$ μm | $\Delta_1$ % | $\Delta_2$ % | $r_2$ μm | $w_2$ μm | Inner Volume | Outer Volume |
|---|---|---|---|---|---|---|---|---|
| Upper limit | 1.21 | 3.55 | 0.12 | 1.2 | 8.66 | 1.71 | 3.90 | 10.16 |
| Lower limit | 0.94 | 2.55 | 0 | 0.3 | 5.54 | — | 2.92 | 2.59 |

It will be understood that all possible combinations of the parameter limits shown in Table 1 will not provide a waveguide having the specified properties. Table 1 was generated by a computer model which allowed one or more parameters to vary until at least one of the specified waveguide properties was outside the allowed range. The parameters of the last core refractive index profile which met the specification was recorded. Thus the upper limit or lower limit of each profile parameter may derive from entirely different profiles each of which meets the specification. The skilled artisan can use the Table 1 to achieve, within a few experimental trials, a profile which provides the specified waveguide properties.

Although particular embodiments of the invention have been disclosed and described herein, the invention is nonetheless limited only by the following claims.

I claim:

1. A single mode optical waveguide fiber designed for high data rate WDM telecommunications systems comprising:

a core region comprising,
  a central region, having a radius $r_0$, an index profile and a relative index of refraction $\Delta_0\%$,
  a first annular region, abutting said central region, having an index profile and a maximum index of refraction $\Delta_1\%$, and,
  a second annular region, abutting said first annular region, having a radius $r_2$, a width $w_2$, an index profile and a maximum index of refraction $\Delta_2\%$,
wherein, $\Delta_0 \geq \Delta_2 > \Delta_1$; and,
a clad layer, surrounding said core region, having a substantially constant index of refraction $n_c$, wherein the maximum refractive index of the first annular region, $n_1$, is such that $n_1 \geq n_c$; and,
wherein, $\Delta_0\%$ is in the range of about 0.79% to 1.21% and $r_0$ is in the range of about 2.55 μm to 3.55 μm, $\Delta_1\%$ is no greater than about 0.2%, and $\Delta_2\%$ is in the range of about 0.3% to 1.2%, $r_2$ is in the range of about 5.50 μm to 8.70 μm, $w_2$ is in the range of about 0.4 μm to 2 μm, and the inner volume is in the range of about 2.9 units to 3.9 units and the outer volume is in the range having a lower limit greater than 7.2 units, an upper limit less than or equal to 10.2 units and a ratio of outer to inner volume in the range 1.96 to 3.04 units.

2. The single mode optical waveguide of claim 1 wherein the respective index profiles and radii of said core regions are chosen to provide:

a total dispersion in the range of about +0.75 ps/nm-km to −5.50 ps/nm-km over the wavelength range 1525 nm to 1565 nm;

a zero dispersion wavelength in the range of about 1575 nm to 1595 nm;

a dispersion slope of magnitude less than about 0.10 ps/nm$^2$-km;

a mode field diameter no less than about 7.90 μm;

a cut off wavelength measured on the cabled waveguide in the range of about 1400 nm to 1520 nm;

a polarization mode dispersion no greater than about 0.25 ps/(km)$^{1/2}$; and, a 75 mm bend induced attenuation no greater than about 0.03 dB and a 32 mm bend induced attenuation no greater than about 0.30 dB.

3. The single mode optical waveguide of claim 1 wherein said central core region, said first annular region, and said second annular region have a refractive index profile selected from the group consisting of an α profile, a step index profile, a rounded step index profile, and a trapezoidal profile.

4. The single mode optical waveguide of claim 3 wherein said central region refractive index profile has an α profile and the α value is 1.

5. The single mode optical waveguide of claim 3 wherein said first annular region has a step index profile.

* * * * *